(12) United States Patent
Katsukura et al.

(10) Patent No.: US 10,795,331 B2
(45) Date of Patent: Oct. 6, 2020

(54) EQUIPMENT SYSTEM AND CONTROL APPARATUS

(71) Applicant: Mitsubishi Electric Corporation, Tokyo (JP)

(72) Inventors: Makoto Katsukura, Tokyo (JP); Taichi Ishizaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 891 days.

(21) Appl. No.: 15/501,543

(22) PCT Filed: Oct. 30, 2014

(86) PCT No.: PCT/JP2014/078917
§ 371 (c)(1),
(2) Date: Feb. 3, 2017

(87) PCT Pub. No.: WO2016/067412
PCT Pub. Date: May 6, 2016

(65) Prior Publication Data
US 2017/0227940 A1    Aug. 10, 2017

(51) Int. Cl.
*G05B 19/042* (2006.01)
*H04Q 9/00* (2006.01)
*H04M 11/00* (2006.01)

(52) U.S. Cl.
CPC .......... *G05B 19/042* (2013.01); *H04M 11/00* (2013.01); *H04Q 9/00* (2013.01); *G05B 2219/2614* (2013.01)

(58) Field of Classification Search
None
See application file for complete search history.

(56) References Cited

U.S. PATENT DOCUMENTS

| 2008/0281472 A1* | 11/2008 | Podgorny | G05B 15/02 700/276 |
| 2009/0083374 A1* | 3/2009 | Saint Clair | G05B 15/02 709/203 |

(Continued)

FOREIGN PATENT DOCUMENTS

| JP | 2002-077745 A | 3/2002 |
| JP | 2005-039517 A | 2/2005 |

(Continued)

OTHER PUBLICATIONS

International Search Report of the International Searching Authority dated Dec. 22, 2014 for the corresponding international application No. PCT/JP2014/078917. (English translation attached).

*Primary Examiner* — Thomas C Lee
*Assistant Examiner* — Gary Collins
(74) *Attorney, Agent, or Firm* — Posz Law Group, PLC

(57) ABSTRACT

A schedule data acquisition requestor requests and acquires schedule data from a sub controller. When a modification to the acquired schedule data is made, a schedule data update requestor sends the modified schedule data to the sub controller and requests an update. A schedule data update processor sends a permission notification to a main controller in response to the update request and writes the modified schedule data onto its own flash memory. Conversely, when a rejection notification is sent from the sub controller, the schedule data update requestor displays a warning message and new schedule data on a screen.

6 Claims, 6 Drawing Sheets

(56) References Cited

U.S. PATENT DOCUMENTS

| | | | |
|---|---|---|---|
| 2014/0059483 A1* | 2/2014 | Mairs | G06F 3/04817 |
| | | | 715/788 |
| 2014/0330435 A1* | 11/2014 | Stoner | H04L 12/2816 |
| | | | 700/275 |

FOREIGN PATENT DOCUMENTS

| | | |
|---|---|---|
| JP | 2006-140691 A | 6/2006 |
| JP | 2007-316863 A | 12/2007 |
| JP | 2012-167884 A | 9/2012 |

* cited by examiner

EQUIPMENT SYSTEM AND CONTROL APPARATUS

CROSS REFERENCE TO RELATED APPLICATION

This application is a U.S. national stage application of International Patent Application No, PCT/JP2014/078917 filed on Oct. 30, 2014, the disclosure of which is incorporated herein by reference.

TECHNICAL FIELD

The present disclosure relates to a facility device system in which controllers for controlling facility devices are connected together via a network and relates to a controller.

BACKGROUND ART

Nowadays, facility device systems that control (monitoring and the like included) facility devices such as air conditioners and lighting apparatuses are installed inside buildings and other structures. In such a facility device system, for example, a controller can control facility devices. Further, in a large-scale facility device system, for example, a controller is installed on each floor, and each controller controls each of the facility devices on the corresponding floor. Even then, there is an upper limit to the number of facility devices that can be controlled directly by these controllers. Therefore, facility device systems that expand the number of facility devices that can be directly or indirectly controlled from a single controller by connecting controllers together via a network have been proposed.

As an example of such kind of a system, Patent Literature 1 discloses an invention of a facility monitoring system that enables facility conditions within a building to be confirmed from outside of the building. In this facility monitoring system, a monitoring server device can communicate with an external device (monitoring information display device) over the Internet and can also communicate with internal devices (each monitoring device) via a LAN. The monitoring server device accesses, in response to a request from the monitoring information display device, a monitoring device (requested monitoring device) that is monitoring facility devices (emergency lights) and obtains a file from the monitoring device. Next, the monitoring server device provides the obtained file to the monitoring information display device to display the monitoring information contained in the file.

CITATION LIST

Patent Literature

Patent Literature 1: Unexamined Japanese Patent. Application Kokai Publication No. 2007-316863

SUMMARY OF INVENTION

Technical Problem

However, in the facility monitoring system disclosed in the above-mentioned Patent Literature 1, separately managed data could not be collected and modified. That is, the monitoring server device in the facility monitoring system in Patent Literature 1 merely redirected requests from the monitoring information display device to the monitoring device, and as a result, each of the monitoring devices responded to the request. Consequently, due to the intermediate processing of such kind of requests, contents of the file could not be modified even though the file of the monitoring device could be displayed (provided to enable display).

Further, in the facility monitoring system in Patent Literature 1, even if the contents of the file were modifiable on the monitoring server device side, neither the monitoring server device nor the monitoring device could update all the files at once. In other words, even if the collected data were modified, the update in each device could not take place at the same time. Moreover, in the facility monitoring system in Patent Literature 1, even if modifications could be made from both the monitoring server device and the monitoring device at the same time both with respect to the same data, only the immediate prior modification would get reflected. In other words, the user operating the monitoring server device and the user operating the monitoring device faced the possibility of not having their own modification to the data made by their own operation get reflected, and furthermore there was concern about the problem of not even being able to recognize that the data was not reflected.

In order to solve the aforementioned problems, an objective of the present disclosure is to provide a facility device system and a controller that can collect and modify separately managed data while preventing problems from occurring even in the event of simultaneous data modification requests by controllers.

Solution to Problem

In order to achieve the aforementioned objective, a facility device system of the present disclosure includes a first controller and a second controller connected together via a network, the first controller and the second controller each being configured to control a facilities device;
wherein the first controller includes:
a first storage configured to store data relating to control of the facility device;
a data update requestor configured to acquire data stored on the second controller and, upon a modification of the data to post-modification data by a user operating the first controller, send the post-modification data to the second controller and request updating; and
a data update processor configured to, after sending of the post-modification data, write data to the first storage in accordance with content of a notification sent from the second controller,
wherein the second controller includes:
a second storage configured to store data relating to control of the facility device;
a determiner configured to determine whether, within a previously set waiting-time period after an acquisition of the post-modification data sent from the first controller, modification is performed on data stored in the second storage by a user operating the second controller; and
a data update processor configured to write the post-modification data to the second storage based on results of the determination made by the determiner,
wherein the data update processor of the second controller is configured to,
upon determination by the determiner that there is no modification of data, send to the first controller a permission notification permitting updating of the post-modification data, and upon determination by the determiner that there is modification of data, send to the first controller a rejection notification rejecting updating of the post-modification data, and wherein the data update processor of the first controller is configured to, upon sending of the permission notification from the second controller, write the post-modification data to the first storage, and upon sending of the rejection notification from the second controller, inform the user operating the first controller that the modification has been rejected.

Advantageous Effects of Invention

According to the present disclosure, the data stored in the second controller can be collected and modified by the first controller. Further, after the sending of the post-modification data from the first controller to the second controller, a determination is made as to whether a modification has been performed on the data stored in the second storage within the previously set waiting-time period. Upon determination that there has been no modification to the data stored in the second controller, a permission notification is sent to the first controller and the post-modification data is written by the first controller and the second controller. However, upon determination that there has been modification to the data stored on the second controller, a rejection notification rejecting modification is sent to the first controller notifying the user operating the first controller that the modification as rejected. Consequently, separately managed data can be collected and modified while preventing problems from occurring even in the event of simultaneous data modification requests by controllers.

DESCRIPTION OF EMBODIMENTS

Figure 1:
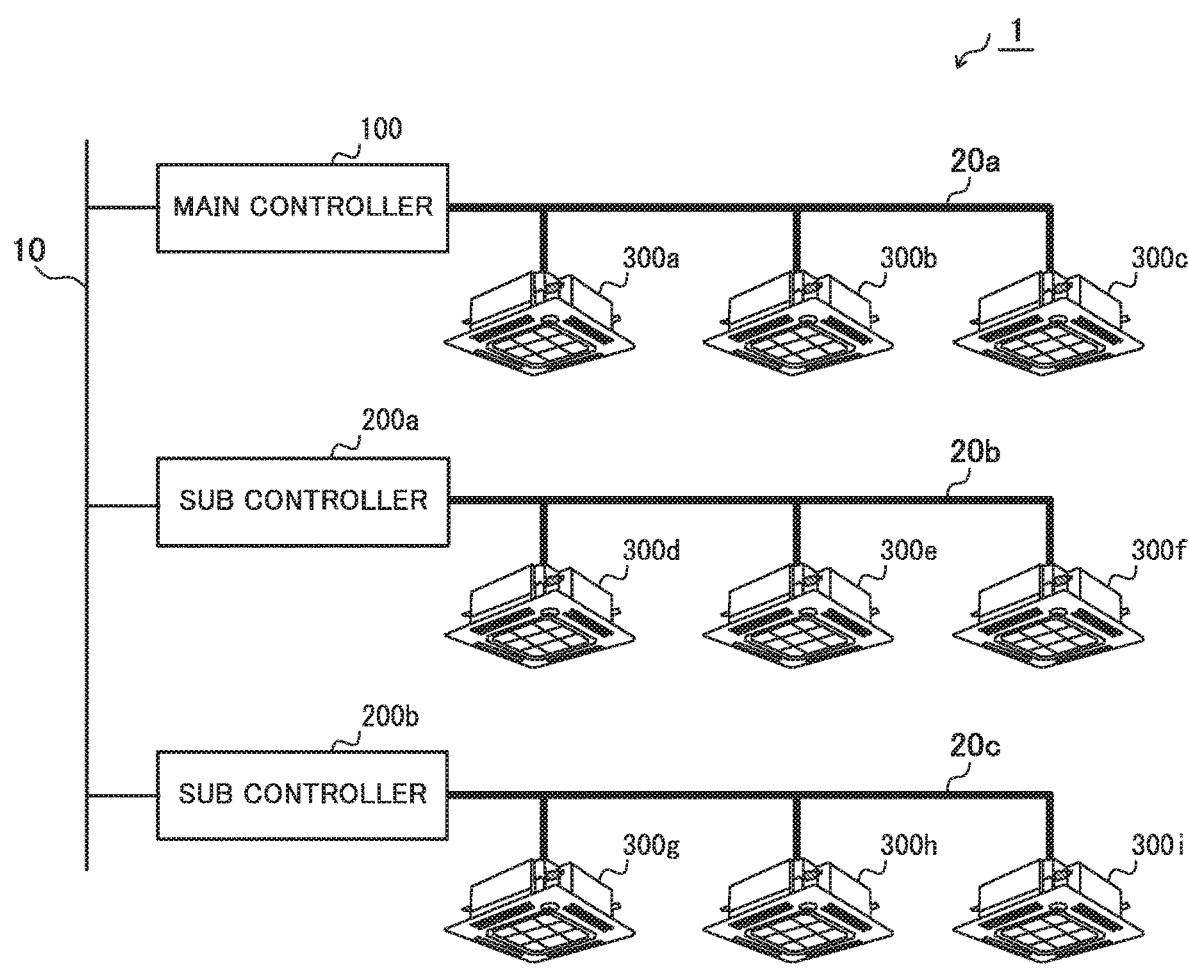
FIG. 1 is a block diagram illustrating an example of an overall configuration of an air-conditioning system according to Embodiment 1 of the present disclosure.

Hereinafter, embodiments of the present disclosure are described in detail with reference to the drawings. In the drawings, the same or corresponding portions are marked with the same reference numerals. The following description is given as a specific example in which the present disclosure is applied to an air-conditioning system in which a first controller (hereinafter referred to as a main controller 100) and a second controller (hereinafter referred to as a sub controller 200) are connected together via a network, but as described below, the present disclosure is also applicable to other systems. That is, the embodiments that are described below are merely illustrative, and are not intended to limit the scope of the present disclosure. Hence, a person skilled in the art could carry out an embodiment in which each or all of elements are replaced with equivalents, and any such embodiment is to be regarded as within the scope of the present disclosure.

Embodiment 1

FIG. 1 is a block diagram illustrating an example of an overall configuration of an air-conditioning system 1 according to Embodiment 1 of the present disclosure. As illustrated in the diagram, the air-conditioning system 1 is a configuration in which a main controller 100 and sub controllers 200 that control air conditioners 300 are connected together via a network 10 such as a Local Area Network (LAN). This air-conditioning system 1, for example, is installed inside a building or another kind of structure and controls (monitoring and the like included) all of the air conditioners 300 in the building or the other kind of structure. As an example, on any given floor of the floors, the main controller 100 or the sub controller 200 is installed and controls air conditioners 300 on the given floor.

Specifically, the main controller 100 is installed on the first floor and is connected together, via a control bus 20a, with air conditioners 300a to 300c located on the same floor. Also, a sub controller 200a is installed on the second floor and is connected together, via a control bus 20b, with air conditioners 300d to 300f located on the same floor. Also, a sub controller 200b is installed on the third floor and is connected together, via a control bus 20c, with air conditioners 300g to 300i located on the same floor. The configuration of the air-conditioning system 1 illustrated in FIG. 1 is just one example and thus, for example, the number of sub controllers 200 and the number of air conditioners 300 can be appropriately changed in accordance with the number of floors and the layout of the building in Which the air-conditioning system 1 is actually installed.

The main controller 100 and the sub controllers 200 (200a and 200b) are controllers that include a central processing unit (CPU), read-only memory (ROM), random access memory (RAM), a communication unit, non-volatile memory (flash memory being one example), a liquid crystal display unit, a touch panel, and the like.

The main controller 100 and each of the sub controllers 200 communicate together via a network 10 and control the corresponding air conditioners 300 via the control bus 20. The main controller 100 and the sub controllers 200 are described in detail further below.

The air conditioners 300 (300a to 300i), for example, include an expansion valve and a load-end heat exchanger, and are connected to an outdoor unit (not shown) via piping. The air conditioners 300 cause the load-end heat exchanger to evaporate or condense refrigerant, thereby performing an air conditioning on a space subjected to air conditioning. In the example given in FIG. 1, the air conditioners 300 are ceiling-embedded units (indoor units) but they may also be wall-mounted units and/or stand-alone units.

Figure 2:
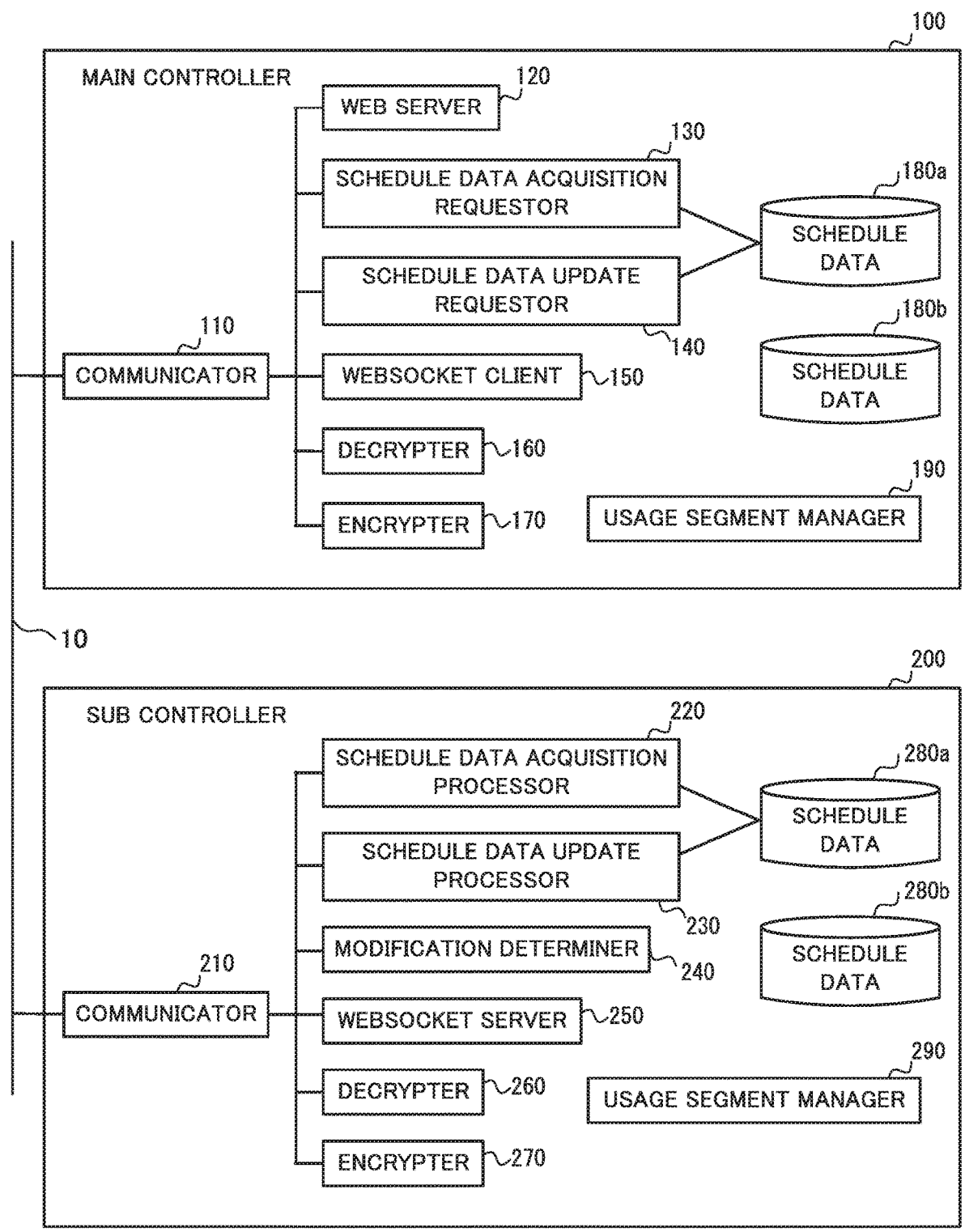
FIG. 2 is a block diagram illustrating an example of a configuration of functions of a main controller and a sub controller.

FIG. 2 is a block diagram illustrating an example of a configuration of functions of the main controller 100 and the sub controller 200. Below, the main controller 100 and the sub controller 200 are described sequentially with reference to this block diagram.

First, the main controller 100, as illustrated in FIG. 2, includes a communicator 110, a web server 120, a schedule data acquisition requestor 130, a schedule data update requestor 140, a WebSocket client 150, a decrypter 160, an encrypter 170, schedule data 180 (180a and 180b) and a usage segment manager 190.

The communicator 110 is executed, for example, by the aforementioned communication unit. Also, the web server 120 to the encrypter 170 are executed, for example, by the aforementioned CPU, ROM, and RAM. In other words, the web server 120 to the encrypter 170 are executed by loading a program stored in the ROM, or the like, into the RAM and using the CPU to execute the loaded program. Also, the schedule data 180 and the usage segment manager 190 are executed, for example, by the aforementioned flash memory. The usage segment manager 190 may also be executed by the aforementioned CPU, ROM, and RAM.

Although omitted in FIG. 2, the main controller 100 also includes a display and an operation acceptor. The display is executed, for example, by the aforementioned liquid crystal display unit, and displays various screens (e.g. the schedule configuration screen). Also, the operation acceptor is executed, for example, by the aforementioned touch panel and accepts a pressing (pressing operation with the user's finger or the like) of a button image (e.g. SET SCHEDULE button) positioned on the configuration screen displayed on the display. The main controller 100 may also be equipped with a speaker or the like for generating an error beep or the like.

The communicator 110 performs communication with the sub controller 200 via the network 10. The communicator 110, for example, is controlled by the schedule data acquisition requestor 130 or the schedule data update requestor 140 and sends/receives schedule data to/from the sub controller 200. When doing so, the communicator 110 performs communication in accordance with WebSocket protocol based on the control of the WebSocket client 150. The WebSocket protocol is described in detail further below together in the description of the WebSocket client 150.

The web server 120 provides data and images in Hyper Text Markup Language (HTML) format in response to requests from a browser or the like.

The schedule data acquisition requestor 130 controls the communicator 110 and requests (issues an acquisition request) schedule data from the sub controller 200. When the requested schedule data is acquired via the communicator 110, the schedule data acquisition requestor 130 uses the decrypter 160 to decrypt the acquired schedule data. In other words, since the schedule data sent from the sub controller 200 is encrypted (encrypted by a public key of the main controller 100), as described further below, its own (the main controller 100) secret key is used to decrypt (decompress) the schedule data. The schedule data acquisition requestor 130 stores the decrypted schedule data as provisional schedule data in a temporary storage area such as the RAM.

Using the provisional schedule data acquired in this manner, the schedule configuration screen of the air conditioner 300 managed by the sub controller 200 is displayed on the liquid crystal unit (display) of the main controller 100. Then, the user operates the schedule configuration screen via the touch panel (operation acceptor) of the main controller 100 and modifies the provisional schedule data.

The schedule data update requestor 140 generates the temporary schedule data (modified schedule data) upon finalization of the modification to the provisional schedule data (for example, upon the user pressing the "SET SCHEDULE button" positioned on the schedule configuration screen). The encrypter 170 then encrypts the temporary schedule data. In other words, a public key of the sub controller 200 is used to encrypt the temporary schedule data.

The schedule data update requestor 140 controls the communicator 110 to transmit the encrypted schedule data (modified schedule data) to the sub controller 200 and also request for the schedule data to be updated. In response to this update request, the sub controller 200 either sends a notification indicating that the update request is permitted (more specifically, a notification indicating completion of the schedule data update reservation) or a notification indicating rejection of the update request (more specifically, a notification indicating rejection of the schedule data update reservation) to the schedule data update requestor 140.

The schedule data update requestor 140 writes, upon acquisition from the sub controller 200 via the communicator 110 of the notification indicating that the update request is permitted, the modified schedule data onto its own (the main controller 100) flash memory. The flash memory is, as described further below, provided with a plurality of segments (for example, segment A and segment B) as the areas for storing the schedule data. And the schedule data update requestor 140 writes the modified schedule data onto a segment not specified as the usage segment by the usage segment manager 190.

On the other hand, the schedule data update requestor 140, upon acquisition of the notification indicating rejection of the update request from the sub controller 200 via the communicator 110, displays on the display a warning message informing the user that the schedule modification attempted by the user was rejected. In addition to displaying such a warning message on the display, the schedule data update requestor 140 may, if the main controller 100 includes a speaker, alert the user with an error beep from the speaker to indicate that the schedule modification was rejected.

If the notification indicating rejection of the update request and the schedule data modified in the sub controller 200 are acquired, the schedule data update requestor 140 updates its own (the main controller 100) provisional schedule data based on the modified schedule data and then discards the temporary schedule data.

In such a way, the schedule data modified (post-update provisional schedule data) in the sub controller 200 is used, and the schedule configuration screen (the configuration screen reflected with the latest schedule) of the air conditioners 300 managed by the sub controller 200 is displayed on the liquid crystal unit (display) of the main controller 100. Then, the user operates the schedule configuration screen via the touch panel (operation acceptor) of the main controller 100 thereby once again allowing modification to the provisional schedule data.

The WebSocket client 150 controls the communicator 110 and communicates with the sub controller 200 in accordance with WebSocket protocol.

The WebSocket protocol is one type of computer network communication protocol and is a technical standard for bi-directional communication between a server and a client. The WebSocket protocol has a dedicated Application Programming interface (API) and dedicated protocol, and runs over Transmission Control Protocol (TCP). The existing Hypertext Transfer Protocol (HTTP) is merely a means for sending a data transmission request from the client side (side which establishes a connection) to the server side (which listens for an incoming connection) so when data was exchanged frequently between the server and the client it was difficult to push data on the server side to the client. In contrast to this, with the WebSocket protocol, after the server and client establish a single connection, the all necessary communication is performed on that connection using dedicated protocol. Consequently, WebSocket protocol has an advantage over other methods used heretofore in that communication loss can be reduced, and influence on other applications connected to the same server is small (because all data transmission and reception can be performed on a single connection).

The decrypter 160 uses a public-key cryptography method referred to as Secure Sockets Layer (SSL) to handle the decrypting part of the data encryption and decryption process. The decrypter 160, for example, uses its own (the main controller 100) secret key to decrypt the schedule data. In other words, when the schedule data encrypted by the public key of the main controller 100 is acquired from the sub controller 200, the encrypted schedule data is then decrypted using the secret key of the main controller 100.

The encrypter 170 uses the public-key cryptography method referred to as SSL to handle the encrypting part of the data encryption and decryption process. The encrypter 170, for example, uses the public key of the sub controller 200 to encrypt the schedule data. In other words, when the schedule data update requestor 140 sends the modified schedule data to the sub controller 200, the schedule data update requestor 140 uses the public key of the sub controller 200, which is the delivery destination, to encrypt the schedule data. As a result, the encrypter 170 retains the public key for the sub controller 200*a* and the public key for the sub controller 200*b*.

The schedule data 180 (180*a* and 180*b*) refers to the schedule data stored in its own (main controller 100) flash memory. For example, after the schedule data acquired from the sub controller 200 is modified, the schedule data 180 is written to and stored in the flash memory.

The flash memory is, for example, provided with segment A and segment B as areas for storing the schedule data. Further, the schedule data 180*a*, for example, represents the schedule data stored in segment A. Conversely, the schedule data 180*b*, for example, represents the schedule data stored in segment B. The usage segment manager 190 described further below specifies which segment, either segment A or segment B, is the usage segment (usage segment to be used for control of the air controllers 300), and the schedule data 180 that is specified as the usage segment is actually used for control of the air conditioners 300. Also, it is preferable that there be a plurality of segments included in the flash memory, for example, there may be three segments such as segment A, segment B, and segment C. In such a case, the usage segment manager 190 specifies one segment out of all of the segments as the usage segment.

The usage segment manager 190 specified either of segment A and segment B provided in the flash memory as the usage segment for use in control of the air conditioner 300. As described above, the schedule data update requestor 140 writes the modified schedule data onto a segment not specified as the usage segment by the usage segment manager 190. Then, after a set period of time elapses, the usage segment manager 190 switches the usage segment. For example, after a set period of time elapses from the time the aforementioned notification indicating that the update request is permitted (more specifically, the notification indicating completion of the schedule data update reservation) is sent by the sub controller 200, the usage segment manager 190 specified, as the usage segment, the segment containing the schedule data written by the schedule data update requestor 140.

Next, as illustrated in FIG. 2, the sub controller 200 includes a communicator 210, a schedule data acquisition processor 220, a schedule data update processor 230, a modification determiner 240, a WebSocket server 250, a decrypter 260, an encrypter 270, schedule data 280 (280*a* and 280*b*), and a usage segment manager 290.

The communicator 210 is executed, for example, by the aforementioned communication unit. Also, the schedule data acquisition processor 220 to the encrypter 270 are executed, for example, by the aforementioned CPU, ROM, and RAM. In other words, the schedule data acquisition processor 220 to the encrypter 270 are executed by loading a program stored in the ROM or the like into the RAM and using the CPU to execute the loaded program. Also, the schedule data 280 and the usage segment manager 290 are executed, for example, by the aforementioned flash memory. The usage segment manager 290 may also be executed by the aforementioned CPU, ROM, and RAM.

Further, the sub controller 200 like the main controller 100 also includes a display and an operation acceptor, neither illustrated. The display is executed, for example, by the aforementioned liquid crystal display unit, and displays various screens. Also, the operation acceptor is executed, for example, by the aforementioned touch panel and accepts a pressing of a button image positioned on the configuration screen displayed on the display.

The communicator 210 performs communication with the main controller 100 via the network 10. The communicator 210, for example, is controlled by the schedule data acquisition processor 220 or the schedule data update processor 230, and sends/receives schedule data and the like to/from the main controller 100. When doing so, the communicator 210 performs communication in accordance with WebSocket protocol based on the control of the WebSocket server 250.

The schedule data acquisition processor 220 acquires a schedule data acquisition request from the main controller 100 via the communicator 210. Then, the schedule data acquisition processor 220 reads the schedule data (more specifically, the schedule data 280 read from the segment specified as the usage segment by the usage segment manager 290) from its own (the sub controller 200) flash memory, and uses the encrypter 270 to encrypt the read schedule data. In other words, the public key of the main controller 100 is used to encrypt the read schedule data. The schedule data acquisition processor 220 controls the communicator 210 to transmit the encrypted schedule data to the main controller 100.

The schedule data update processor 230 acquires from the main controller 100, via the communicator 210, the schedule data (schedule data modified on the main controller 100 side) and the update request. The schedule data update processor 230 uses the decrypter 260 to decrypt the acquired schedule data. In other words, since the schedule data sent from the main controller 100 is encrypted (encrypted with the public key of the sub controller 200) as described above, its own (the sub controller 200) secret key is used to decrypt the schedule data.

When confirmation is made using decryption that the schedule data was not tampered with or damaged, the schedule data update processor 230 waits for determination results by the modification determiner 240 indicating whether a modification was made to the schedule data on the sub controller 200 side. The modification determiner 240, as described further below, shifts to a waiting state for a predetermined period of time, and determines whether a modification has been made to the schedule data on the sub controller 200 side within this waiting-time period. In other words, the modification determiner 240 determines whether a modification is made to the schedule data on the sub controller 200 side while the schedule data on the main controller 100 side is in a modified state. Then, the schedule data update processor 230, based on the determination results, executes the process described below.

Upon determination that no modification has been made to the data on the sub controller 200 side, the schedule data update processor 230 controls the communicator 210 to transmit to the main controller 100 the notification indicating completion of the schedule data update reservation. Then the schedule data update processor 230 writes the schedule data (modified schedule data) to its own (the sub controller 200) flash memory. The flash memory is, for example, provided with a plurality of segments (for example, segment A and segment B) as the areas for storing the schedule data. The schedule data update processor 230 writes the modified schedule data onto a segment not specified as the usage segment by the usage segment manager 290.

Conversely, upon determination that modification has been made to the data on the sub controller 200 side, the schedule data update processor 230 controls the communicator 210 to transmit to the main controller 100 the notification indicating rejection of the schedule data update reservation. Even if a modification has been made on the sub controller 200 side, as long as there is no overlap between the modified portions, both modifications can be reflected at the same time. Therefore, as described further below, the modification determiner 240 compares both of the modified portions and determines whether there is overlap. When the modified portions are determined not to overlap, the schedule data update processor 230 integrates both of the modified portions together, generates post-modification schedule data, and transmits to the main controller 100 the post-modification schedule data together with the notification indicating rejection of the schedule data update reservation. Further, even if a determination is made that the modified portions overlap, just one of the modified portions may be reflected in accordance with a predetermined order of priority. For example, if the sub controller 200 side is assigned a higher priority ranking, the schedule data update processor 230 would generate post-modification schedule data reflected with only the portion modified on the sub controller 200 side, and transmit to the main controller 100 the post-modification schedule data together with the notification indicating rejection of the schedule data update reservation.

When the decrypting of the schedule data sent from the main controller 100 side is perforated by the schedule data update processor 230 (when confirmation is made using decryption that the schedule data was not tampered with or damaged), the modification determiner 240 shifts to the waiting state for a predetermined period of time, and determines whether a modification is made to the schedule data on the sub controller 200 side within this waiting-time period. In other words, the modification determiner 240 determines whether a modification has been made to the schedule data by a user operating the touch panel (operation acceptor) of the sub controller 200 while the schedule data is in a modified state on the min controller 100 side. When the waiting-time period has elapsed without modification to the schedule data, the modification determiner 240 notifies the schedule data update processor 230 regarding the determination result indicating that no modification has taken place.

Conversely, when a modification is made to the schedule data, the modification determiner 240 notifies the schedule data update processor 230 regarding the determination result indicating that a modification has been made. However, even if a modification has been made on the sub controller 200 side, as long as that modified portion does not overlap with the modified portion made on the main controller 100 side, both modifications can be reflected at the same time. Therefore, the modification determiner 240 compares both of the modified portions and determines whether there is overlap. As an example, the modification determiner 240 determines whether there is overlap as follows.

The modification determiner 240 first finalizes the modified portion on the sub controller 200 side. In other words, an operation performed by the user causes the modification determiner 240 to finalize whether a modification was made from a given byte to another given byte of the schedule data. More specifically, the modification determiner 240 converts the modification of the schedule made by the user into a data format, compares this modified schedule data with the current schedule data and finalizes whether a modification was made from a given byte to another given byte. There may be a plurality of modified portions. The information regarding the modified portions is temporarily stored in the RAM described above.

Next, the modification determiner 240 finalizes the modified portion made on the main controller 100 side. In other words, the modification determiner 240 finalizes whether modification was made from a given byte to another given byte of the schedule data acquired from the main controller 100. More specifically, the modification determiner 240 compares the schedule data transmitted from the main controller 100 (schedule data modified on the main controller 100 side) with the current schedule data, and finalizes whether modification was made from a given byte to another given byte of the schedule data acquired from the main controller 100. There may be a plurality of modified portions. The information regarding the modified portions is temporarily stored in the RAM described above.

Then, the modification determiner 240 compares the information regarding both of the modified portions stored in the RAM and determines whether there is overlap. The modification determiner 240 also notifies the schedule data update processor 230 about the determination results pertaining to the overlap. When there is no overlap between the modified portions (when the modified portion made on the main controller 100 side and the modified portion made on the sub controller 200 side are different), the schedule data update processor 230 integrates the two modified portions together and generates post-modification schedule data. Further, even if the modified portions overlap with each other, post-modification schedule data reflected with only one modified portion may be generated in accordance with a predetermined order of priority. For example, if the sub controller 200 side is assigned a higher priority ranking, the schedule data update processor 230 would generate post-modification schedule data reflected with only the modification made on the sub controller 200 side.

The WebSocket server 250 controls the communicator 210 and communicates with the main controller 100 in accordance with WebSocket protocol.

The decrypter 260 uses the public-key cryptography method referred to as SSL to handle the decrypting part of the data encryption and decryption process. The decrypter 260, for example, uses its own (the sub controller 200) secret key to decrypt the schedule data. In other words, when the schedule data encrypted by the public key of the sub controller 200 is acquired from the main controller 100, the encrypted schedule data is then decrypted using the secret key of the sub controller 200.

The encrypter 270 uses the public-key cryptography method referred to as SSL to handle the encrypting part of the data encryption and decryption process. The encrypter 270, for example, uses the public key of the main controller 100 to encrypt the schedule data. In other words, when the schedule data acquisition processor 220 sends to the main controller 100 the schedule data for which acquisition is requested, the public key of the main controller 100 is used to encrypt the schedule data.

The schedule data 280 (280*a* and 280*b*) refers to the schedule data stored in its own (the sub controller 200) flash memory. The schedule data 280 written and stored in the flash memory is, for example, the schedule data (modified schedule data) sent from the main controller 100.

The flash memory is, for example, provided with segment A and segment B as areas for storing the schedule data. Further, the schedule data 280*a*, for example, represents the schedule data stored in segment A. Conversely, the schedule data 280*b*, for example, represents the schedule data stored in segment B. The usage segment manager 290, described further below, specifies which segment, either segment A or segment B, is the usage segment, and the schedule data 280 that is specified as the usage segment is actually used for control and the like. Also, it is preferable that there be a plurality of segments included in the flash memory, for example, there may be three segments such as segment A, segment B, and segment C. In such a case, the usage segment manager 290 specifies one segment out of all of the segments as the usage segment.

The usage segment manager 290 specifies, as the usage segment, either of segment A and segment B provided in the flash memory. As described above, the schedule data update processor 230 writes the modified schedule data onto a segment not specified as the usage segment by the usage segment manager 290. Then, after a set period of time elapses, the usage segment manager 290 switches the usage segment. For example, after a set period of time elapses from the time the aforementioned notification that the update reservation request is permitted (more specifically, the notification indicating completion of the schedule data update reservation) is sent to the main controller 100, the usage segment manager 290 specifies, as the usage segment, the segment containing the data written by the schedule data update processor 230.

Figure 3:
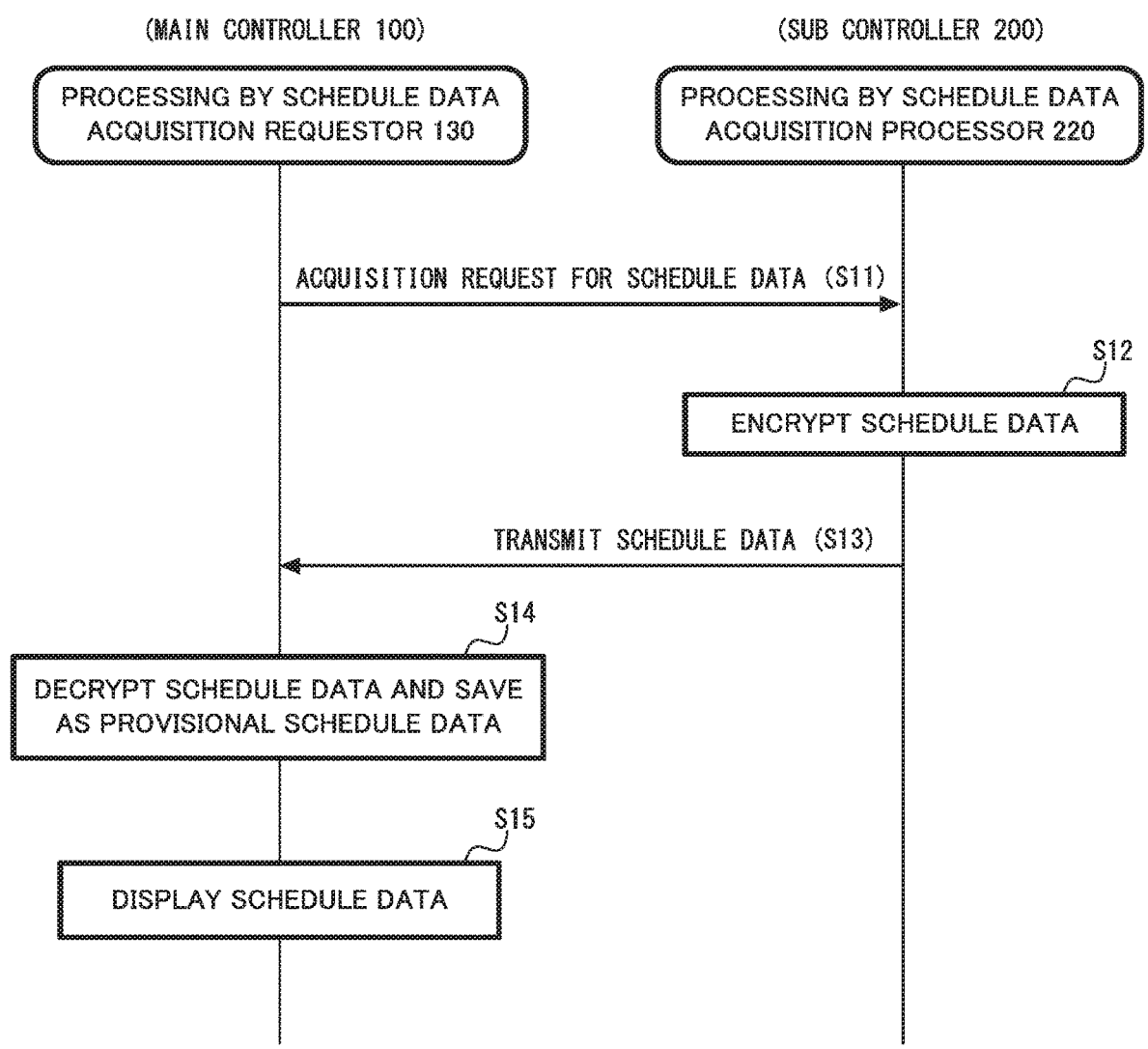
FIG. 3 is a flowchart that describes an operation of acquiring schedule data.
Figure 4:
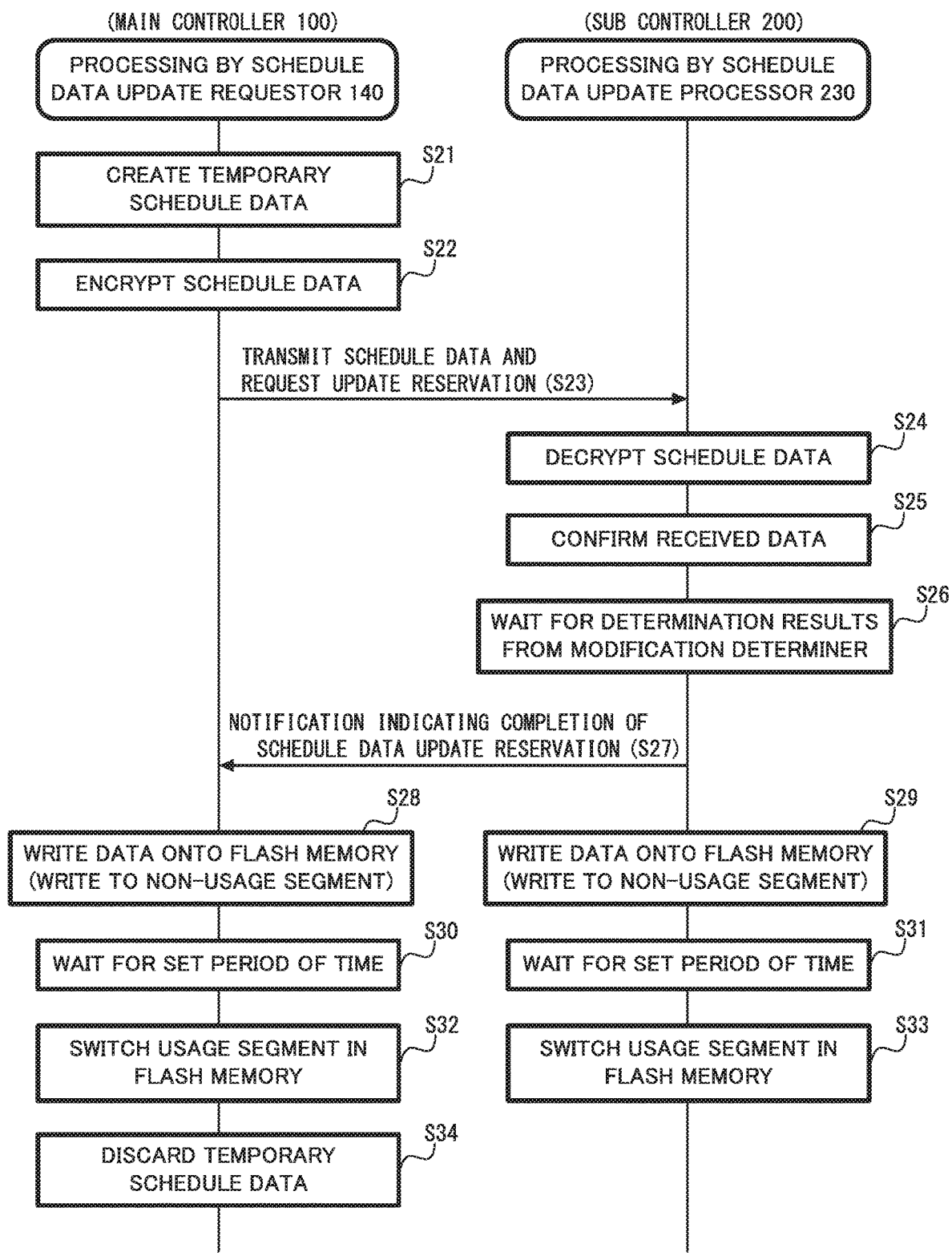
FIG. 4 is a flowchart that describes an operation of updating schedule data.
Figure 5:
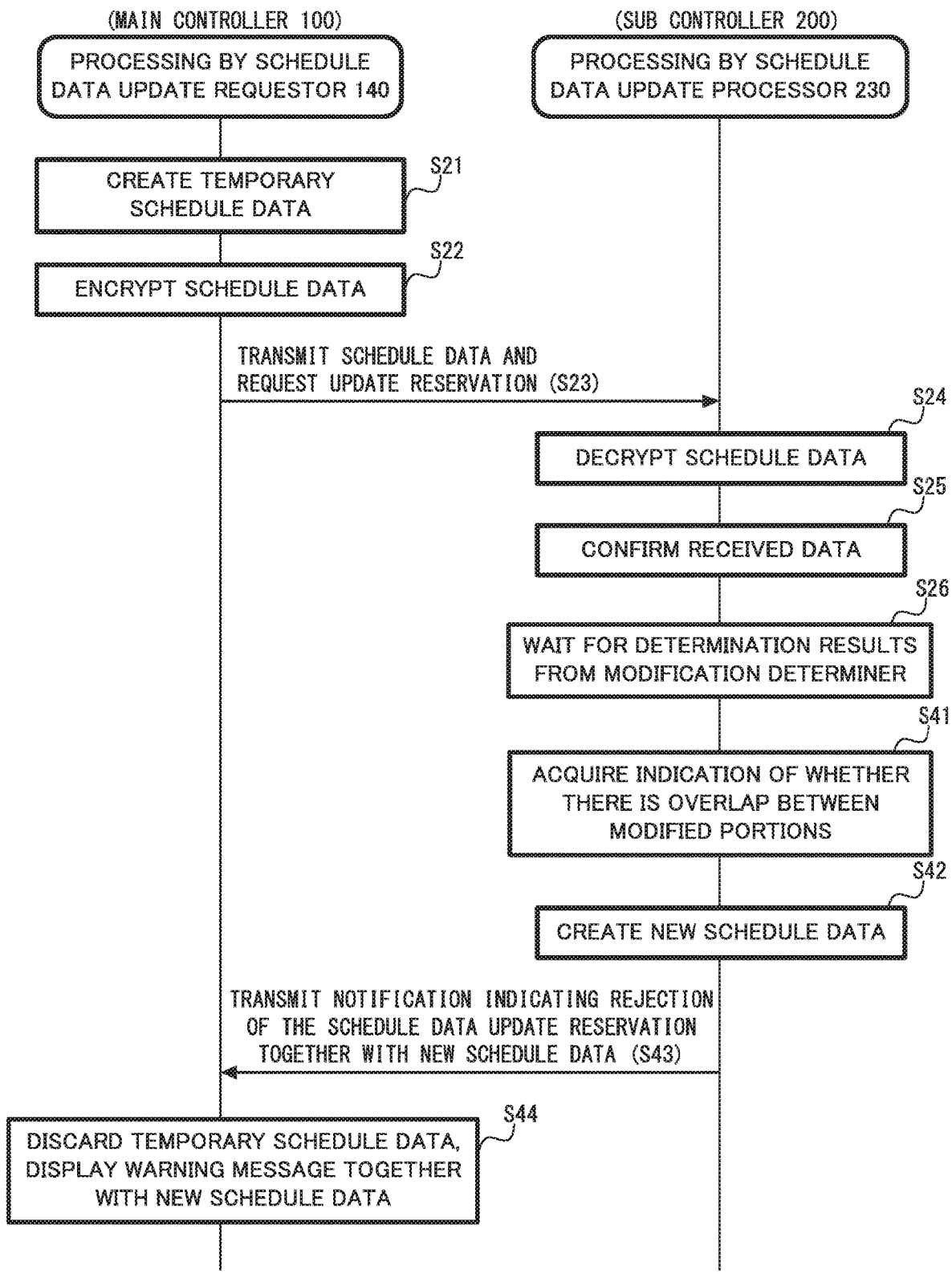
FIG. 5 is a flowchart that describes another operation of updating schedule data.

The operations for the air-conditioning system 1 having such a configuration is described below with reference to FIGS. 3 to 5. FIG. 3 is a flowchart that describes an operation acquiring schedule data. FIGS. 4 and 5 are flowcharts that describe an operation of updating the schedule data.

First, the operation of acquiring the schedule data is described with reference to FIG. 3. The operation of acquiring the schedule data, for example, starts after the touch panel (operation acceptor) accepts an instruction made by the user from the selection screen, indicating the schedule data of a particular air conditioner 300 to be modified, the schedule data of another air conditioner 300 of which the modification is to be based, and so on, displayed on the liquid crystal unit (display) of the main controller 100.

First, the schedule data acquisition requestor 130 of the main controller 100 controls the communicator 110 to make a request to the sub controller 200 for acquisition of the schedule data (step S11).

For example, the schedule data acquisition requestor 130 automatically determines the floor on which the air conditioner 300 (the air conditioner for which the schedule data is to be modified) selected by the user is installed, and automatically determines the sub controller 200 that is managing that particular air conditioner 300. As one example, the schedule data acquisition requestor 130 specifies the sub controller 200 managing the schedule data of the selected air conditioner 300 based on information prescribing the corresponding relationship between the air conditioners 300 and the floors and information prescribing the corresponding relationship between the sub controllers 200 and the floors. The schedule data acquisition requestor 130 also makes a request to the sub controller 200 for acquisition of the schedule data.

The schedule data acquisition processor 220 of the sub controller 200 encrypts the schedule data (step S12).

That is, the schedule data acquisition processor 220, upon acquisition from the main controller 100 of the request for acquisition of the schedule data via the communicator 210, reads from its own (the sub controller 200) flash memory the schedule data (more specifically the schedule data 280 stored in the segment specified as the usage segment by the usage segment manager 290), and then uses the encrypter 270 to encrypt the read schedule data. In other words, the public key of the main controller 100 is used to encrypt the read schedule data.

The schedule data acquisition processor 220 transmits the schedule data to the main controller 100 (step S13). In other words, the schedule data acquisition processor 220 controls the communicator 210 to transmit the encrypted schedule data to the main controller 100.

The schedule data acquisition requestor 130 decrypts the schedule data and saves the decrypted schedule data as provisional schedule data (step S14).

That is, the schedule data acquisition requestor 130, upon acquisition via the communicator 110 of the requested schedule data, uses the decrypter 160 to decrypt the acquired schedule data. In other words, the schedule data acquisition requestor 130 uses its own (the main controller 100) secret key to decrypt the schedule data encrypted by the public key of the main controller 100. The schedule data acquisition requestor 130 then saves the decrypted schedule data as provisional schedule data into a temporary storage area such as the RAM.

The schedule data acquisition requestor 130 causes the display to display the schedule data (step S15).

That is, the schedule data acquisition requestor 130 displays the schedule configuration screen of the air conditioner 300 managed by the sub controller 200, based on the provisional schedule data obtained in this manner, on the liquid crystal unit of the main controller 100. Therefore, the user operates the schedule configuration screen via the touch panel (operation acceptor) of the main controller 100 to modify the provisional schedule data.

Next, the operation of updating the schedule data is described with reference to FIGS. 4 and 5. FIG. 4 is a flowchart that describes the operation that occurs during the modifying of the schedule data on the main controller 100 side when the schedule data has not been modified on the sub controller 200 side. FIG. 5 is a flowchart that describes the operation during the modifying of the schedule data on the main controller 100 side when the schedule data has been modified on the sub controller 200 side. Both of the updating operations of the schedule data, for example, start after performing the tasks, via the touch panel, of operating the previously described schedule configuration screen, modifying the provisional schedule data, and pressing the "SET SCHEDULE button" which indicates that the modification is complete. First, the operation during the modifying of the schedule data on the main controller 100 side when the schedule data on the sub controller 200 side has not been modified is described with reference to FIG. 4.

First, the schedule data update requestor 140 of the main controller 100 generates temporary schedule data (step S21). In other words, the schedule data update requestor 140 generates temporary schedule data indicating the modified schedule data and, for example, saves the temporary schedule data in a temporary storage area such as the RAM.

The schedule data update requestor 140 encrypts the schedule data (step S22). That is, the schedule data update requestor 140 uses the encrypter 170 to encrypt the temporary schedule data. In other words, encryption is performed using the public key of the sub controller 200.

The schedule data update requestor 140 transmits the schedule data to the sub controller 200 and requests an update reservation (step S23). That is, the schedule data update requestor 140 controls the communicator 110 to transmit the encrypted schedule data (the modified schedule data) to the sub controller 200 and also request an update reservation for the schedule data.

The schedule data update processor 230 of the sub controller 200 decrypts the schedule data (step S24). That is, the schedule data update processor 230 uses the decrypter 260 to decrypt the acquired schedule data. In other words, since the schedule data sent from the main controller 100 is encrypted by the public key of the sub controller 200, the decrypter 260 is used to perform the decrypting. In other words, decryption is performed using its own (the sub controller 200) secret key.

The schedule data update processor 230 confirms the received data (step S25). That is, the schedule data update processor 230 uses decryption to confirm that the schedule data was not tampered with or damaged. If the data has been altered or damaged, the schedule data cannot be properly decrypted and therefore is discarded.

The schedule data update processor 230 waits for the determination results of the modification determiner 240 (step S26). In other words, the modification determiner 240 shifts to a waiting state for a predetermined period of time, and determines whether a modification has been made to the schedule data on the sub controller 200 side within this waiting-time period. The schedule data update processor 230 waits for the determination results. The waiting-time period for the modification determiner 240 is approximately several seconds. This is the time necessary for the operation acceptor of the sub controller 200 to accept the modification to the schedule data made by the user.

Upon acquisition of the determination results, from the modification determiner 240, indicating that that no modification was made to the schedule data on the sub controller 200 side, the schedule data update processor 230 transmits to the main controller 100 the notification indicating completion of the schedule data update reservation (step S27). That is, the schedule data update processor 230 controls the communicator 210 to transmit to the main controller 100 the notification indicating completion of the schedule data update reservation, which is the notification indicating that the update reservation is permitted.

At this point in time, the schedule data has not yet been written to the flash memory of the main controller 100 and the flash memory of the sub controller 200. Also, since the data size of the notification indicating completion of the schedule data update reservation is extremely small, the notification arrives at the main controller 100 almost instantly. That is, any time delays are negligible. Also, as indicated below, immediately after the data arrives, the operation begins for writing the modified schedule data to the flash memory (the segment different from the usage segment) of the main controller 100 and the flash memory (the segment different from the usage segment) of the sub controller 200.

The schedule data update requestor 140 performs the writing of the data to the flash memory (step S28). That is, when notification indicating completion of the schedule data update reservation is acquired via the communicator 110 from the sub controller 200, the schedule data update requestor 140 writes the modified schedule data onto its own (the main controller 100) flash memory. At such time, the schedule data update requestor 140 writes the modified schedule data onto a segment not specified as the usage segment by the usage segment manager 190.

Also, at the same time, the schedule data update processor 230 performs the writing of the data to the flash memory (step S29). That is, the schedule data update processor 230 writes the decrypted schedule data (modified schedule data) to its own (the sub controller 200) flash memory. At such time, the schedule data update processor 230 writes the modified schedule onto a segment not specified as the usage segment by the usage segment manager 290.

In steps S28 and S29, both controllers write to their respective flash memory at the same speed. The writing time to the flash memory is proportional to the size of the data being written, thus the main controller 100 and the sub controller 200 both complete writing to their respective flash memory nearly simultaneously.

The schedule data update requestor 140 waits for a certain period of time (step S30). In other words, the schedule data update requestor 140 waits for a certain period of time after the receipt of the notification indicating completion of the schedule data update reservation.

Likewise, the schedule data update processor 230 also waits for a certain period of time (step S31). In other words, the schedule data update processor 230 waits for a certain period of time after the transmission to the main controller 100 of the notification indicating completion of the schedule data update reservation. The waiting times in steps S30 and S31 prevent non-conformity from occurring even if the writing completes while the schedule data is still being read. This, in other words, guarantees that the reading of schedule data of the usage segment will not be underway.

The schedule data update requestor 140 switches the usage segment in the flash memory (step S32). That is, the schedule data update requestor 140 instructs the usage segment manager 190 to perform a usage segment switch. In other words, the usage segment manager 190 specifies, as the usage segment, the segment containing the schedule data that was written by the schedule data update requestor 140 in aforementioned step S28.

Also, at the same time, the schedule data update processor 230 switches the usage segment in the flash memory (step S33). That is, the schedule data update processor 230 instructs the usage segment manager 290 to perform the usage segment switch. In other words, the usage segment manager 290 specifies, as the usage segment, the segment containing the schedule data that was written by the schedule data update processor 230 in aforementioned step S29. The schedule data updated by both the main controller 100 and the sub controller 200 in steps S32 and S33 enable the control of the air conditioner 300 at the same time.

The schedule data update requestor 140 discards the temporary schedule data (step S34). In other words, since the writing to the flash memory is finished, the schedule data update requestor 140 discards the temporary schedule data, being no longer needed.

Next, the operation during the modifying of the schedule data on the main controller 100 side when the schedule data has been modified on the sub controller 200 side is described with reference to FIG. 5. Since the process of steps S21 to S26 is the same as the process in FIG. 4 the description here is omitted. The process from step S41 onward is described below.

Upon acquisition of the determination results, from the modification determiner 240, indicating that a modification was made to the schedule data on the sub controller 200 side, the schedule data update processor 230 acquires, from the modification determiner 240, indication of whether there is overlap between the modified portions (step S41). In other words, since the modification determiner 240 confirms the modified portion on the sub controller 200 side and the modified portion on the main controller 100 side and subsequently determines whether the modified portions overlap with each other, the schedule data update processor 230 also acquires from the modification determiner 240 determination results indicating whether there is overlap.

The schedule data update processor 230 generates new schedule data (step S42). That is, the schedule data update processor 230 generates post-modification schedule data in accordance with the determination results indicating whether there is overlap. For example, when there is no overlap between the modified portions (the modified portion on the main controller 100 side and the modified portion on the sub controller 200 side are different), the schedule data update processor 230 integrates the two modified portions and generates post-modification schedule data. Even if overlap exists, as long there is an assigned order of priority, the schedule data update processor 230 generates post-modification schedule data reflected with only the modified portion of the controller assigned with the higher priority ranking. For example, if the sub controller 200 side is assigned a higher priority ranking, the schedule data update processor 230 would generate post-modification schedule data reflected with only the modified portion on the sub controller 200 side.

The schedule data update processor 230 transmits both the notification indicating rejection of the schedule data update reservation and the new schedule data to the main controller 100 (step S43). That is, the schedule data update processor 230 controls the communicator 210 to transmit both the notification indicating rejection of the schedule data update reservation and the schedule data generated in step S42 to the main controller 100.

The schedule data update requestor 140 discards the temporary schedule data, displays a warning message on the display, and also displays the new schedule data on the display (step S44). That is, the schedule data update requestor 140 displays on the display a warning message to inform the user that the schedule modification attempted by the user was rejected. Further, the schedule data update requestor 140 updates its own (the main controller 100) provisional schedule data based on the new schedule data that was sent, and then discards the temporary schedule data. Next, the configuration screen reflected with the latest schedule based on the post-update. provisional schedule data is displayed on the display of the main controller 100. Further, the user operates the schedule configuration screen via the operation acceptor of the main controller 100 thereby once again allowing modification to the provisional schedule data.

As described above, the schedule data stored in the flash memory of the sub controller 200 is read in response to the acquisition request from the main controller 100 and is then transmitted to the main controller 100. Also, when an operation is performed by the main controller 100 to modify this schedule data, the modified schedule data is transmitted to the sub controller 200. The sub controller 200, prior to writing the modified schedule data to its own flash memory, transmits the notification indicating completion of the schedule data update reservation to the main controller 100. Then, the main controller 100, triggered by the notification indicating completion of the schedule data update reservation, writes the modified schedule data to its own flash memory. Doing so enables separately managed data to be collected and modified and enables modified data to be updated in each controller at the same time.

Also, a determination is made as to whether a modification has been made to the schedule data on the sub controller 200 side while the schedule data on the main controller 100 side is in a modified state, and if a modification has been made, a notification indicating rejection of the schedule data update reservation is sent to the main controller 100 and a warning message is displayed. Therefore, the user on the main controller 100 side learns from this that his or her attempted modification was rejected. Even if the modification is made on the sub controller 200 side, as long as the modified portion on the sub controller 200 side does not overlap with the modified portion on the main controller 100 side, both of the modifications can be reflected at the same time. Therefore, the sub controller 200 generates new schedule data in which both of the modified portions are integrated together and then transmits the new schedule data to the main controller 100. Even if overlap exists between the modified portions, as long as there is an assigned order of priority, the sub controller 200 generates post-modification schedule data reflected with only the modified portion of the controller assigned with the higher priority ranking. The main controller 100 that received the new schedule data as described above displays the configuration screen reflected with the new schedule data, after which the user can perform modification to the schedule data again.

Also, the encrypting and decrypting performed during the transmission and reception of the schedule data between the main controller 100 and the sub controller 200 eliminates the risk of alterations and eavesdropping and enables for the schedule data to be safely collected and updated.

In the above description, when the modified portion on the main controller 100 side and the modified portion on the sub controller 200 side overlap, although priority was assigned to the modification of the sub controller 200, priority may instead be assigned to the modification of the main controller 100.

Embodiment 2

Figure 6:
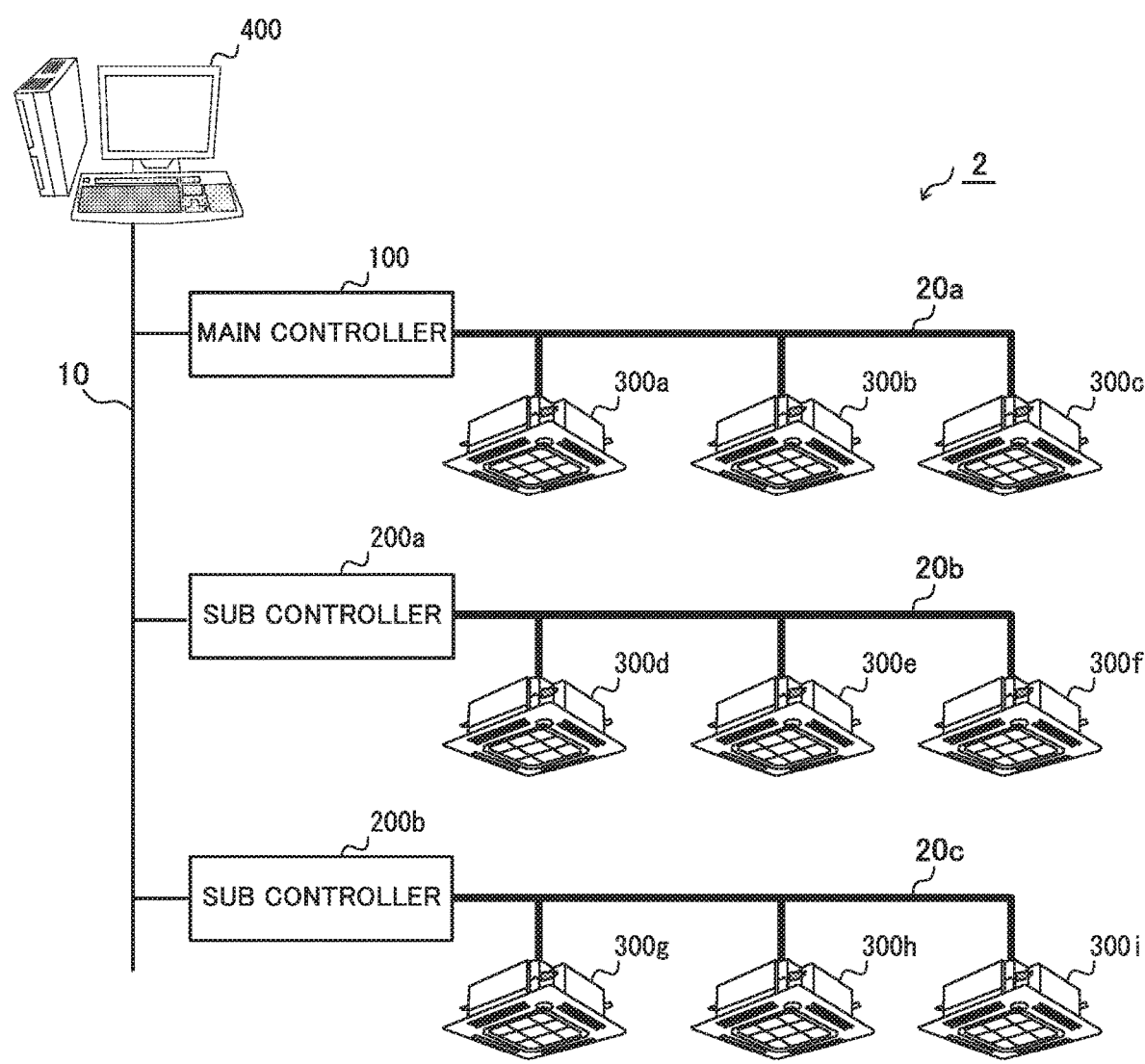
FIG. 6 is a block diagram illustrating an example of an overall configuration of an air-conditioning system according to Embodiment 2 of the present disclosure.

The air-conditioning system 1 according to aforementioned Embodiment 1 has the configuration illustrated in the FIG. 1 described above but the configuration may alternatively be, for example, the configuration illustrated in FIG. 6. An air-conditioning system 2 according to Embodiment 2 of the present disclosure illustrated in FIG. 6 is different from the air-conditioning system 1 of Embodiment 1 in that the air-conditioning system 2 further includes a management information display device 400. In the following description, components common to those of Embodiment 1 are denoted with the same reference numerals.

As illustrated in FIG. 6, the air-conditioning system 2 is a configuration in which a management information display device 400, in addition to the main controller 100 and the sub controllers 200 that control the corresponding air conditioners 300, are connected together via the network 10. This air-conditioning system 2, for example, is installed inside a building or structure and controls (monitoring and the like included) all of the air conditioners 300 inside the building or structure. As an example, on any given floor of the floors, the main controller 100 or the sub controller 200 is installed and controls the air conditioners 300 on the given floor. Further, the management information display device 400 is installed in, for example, a central control room.

The configuration of the main controller 100, the sub controllers 200 (200a, 200b) and the air conditioners 300 (300a to 300i) is the same as the configuration of the air-conditioning system 1 according to aforementioned Embodiment 1.

The management information display device 400, for example, is a general-purpose personal computer (PC) or the like capable of executing a web browser, and is operated by the user. The web browser executed by the management information display device 400 accesses the web server 120 of the main controller 100 via the network 10 thereby enabling control of the main controller 100. In other words, the air-conditioning system 2 according to Embodiment 2 is different front the air-conditioning system 1 of Embodiment 1 in that the user indirectly operates the main controller 100 via the web browser of the management information display device 400 instead of directly operating the main controller 100.

The main controller 100 operated by the user via the web browser of the management information display device 400 performs the operation of acquiring the schedule data and the operation of updating the schedule data in the same manner as that in aforementioned Embodiment 1.

For example, after operation of the management information display device 400 and selection, namely, of the schedule data of a particular air conditioner 300 to be modified and the schedule data of another particular air conditioner 300 of which the modification is to be based, by the user, the main controller 100 performs the operation of acquiring the schedule data.

That is, the main controller 100 requests the sub controller 200 to acquire the schedule data. The sub controller 200 reads the schedule data (more specifically, the schedule data 280 stored in a segment specified as the usage segment by the usage segment manager 290) stored in its own flash memory and transmits the read schedule data to the main controller 100. Then, the schedule configuration screen is displayed on the web browser of the management information display device 400 by the web server 120 of the main controller 100. The user operates the schedule configuration screen displayed on the management information display device 400 to modify the schedule data.

After the user operates the management information display device 400, modifies the schedule data, and presses the "SET SCHEDULE button" indicating completion of the modification, the main controller 100 performs the operation of updating the schedule data.

That is, the main controller 100 transmits the modified schedule data to the sub controller 200 and also requests a schedule data update reservation. The sub controller 200, after having determined whether modification to the schedule data by the user operating the operation acceptor was performed within a waiting-time period, transmits the notification indicating completion of the schedule data update reservation or the notification indicating rejection of the schedule data update reservation together with the new schedule data to the main controller 100 prior to writing the modified schedule data to its own flash memory. When the main controller 100 receives the notification indicating completion of the schedule data update reservation, the main controller 100 writes the modified schedule data to its own flash memory. Conversely, when the main controller 100 receives the notification indicating rejection of the schedule data update reservation, a warning message is displayed and the schedule configuration screen is updated based on the new schedule data.

Doing so enables separately managed data to be collected and modified, and enables the modified data to be updated in each controller at the same time. Also, the warning message can inform the user that the schedule modification attempted by the user was rejected. Further, the configuration screen reflected with the new schedule data is displayed thereby enabling the user to perform modification to the schedule data again.

Also, the encrypting and decrypting performed during the transmission and reception of the schedule data between the main controller 100 and the sub controller 200. This eliminates the risk of alterations and eavesdropping and enables for the schedule data to be safely collected and updated.

Other Embodiments

In the descriptions given in aforementioned Embodiments 1 and 2, schedule data transmission and reception is performed between the main controller 100 and the sub controllers 200 however the data used in the air-conditioning systems 1 and 2 is not limited the schedule data and may be another kind of data. For example, any kind of data can be used as long as it is associated data related to the control of the air conditioners 300 such as log data or data for controlling special operations (for example power-saving operation).

In aforementioned Embodiments 1 and 2, the air-conditioning systems 1 and 2 are given as examples of a facility device system for controlling facility devices but the present disclosure is equally applicable to other systems as well. For example, the present disclosure may be appropriately applied to, for example, a lighting system for controlling the lighting as facility devices.

In the above embodiments, examples are given in which dedicated controllers (the main controller 100 and the sub controllers 200) are used. However, if a program that defines the operations of such dedicated controllers is applied to a conventional PC, an information terminal, and the like, such a PC and the like can function as the main controller 100 and the sub controllers 200 of the present disclosure.

Also, any method for distributing such kind of program is acceptable. For example, the program may be stored in a non-transitory computer-readable recording medium, such as a Compact Disc Read-Only Memory (CD-ROM), a Digital Versatile Disc (DVD), a Magneto Optical Disc (MO), or a memory card for distribution, or may be distributed via a communication network such as the Internet.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is applicable to facility device systems and controllers that can collect and modify separately managed data, and prevent problems from occurring even when modification requests are made at the same time.

REFERENCE SIGNS LIST 1, 2 Air-conditioning system
10 Network
20 Control bus
100 Main controller
110, 210 Communicator
120 Web server
130 Schedule data acquisition requestor
140 Schedule data update requestor
150 WebSocket client
160, 260 Decypter
170, 270 Encrypter
180, 280 Schedule data
190, 290 Usage segment manager
200 Sub controller
220 Schedule data acquisition processor
230 Schedule data update processor
240 Modification determiner
250 WebSocket server
300 Air conditioner
400 Management information display device

The invention claimed is:

1. A facility device system comprising a first controller and a second controller connected together via a network, the first controller and the second controller each being configured to control a facility device,
wherein the first controller comprises:
a first storage configured to store data relating to control of the facility device;
a data update requestor configured to acquire second data stored on the second controller and, upon a modification of the second data to post-modification data by a user operating the first controller, send the post-modification data to the second controller and request updating; and
a first data update processor configured to, after sending of the post-modification data, write data to the first storage in accordance with content of a notification sent from the second controller,
wherein the second controller comprises:
a second storage configured to store data relating to control of the facility device, the data including the second data;
a determiner configured to determine whether, after an acquisition of the post-modification data sent from the first controller, modification is performed on data stored in the second storage by a user operating the second controller; and
a second data update processor configured to write the post-modification data to the second storage based on results of the determination made by the determiner,
wherein the second data update processor is configured to, upon determination by the determiner that there is no modification of data, send to the first controller a permission notification permitting updating of the post-modification data, and
upon determination by the determiner that there is modification of data, send to the first controller a rejection notification rejecting updating of the post-modification data, and
wherein the first data update processor is configured to,
upon sending of the permission notification from the second controller, write the post-modification data to the first storage, and
upon sending of the rejection notification from the second controller, inform the user operating the first controller that the modification has been rejected.

2. The facility device system according to claim 1, wherein
the second data update processor is further configured to, when sending the rejection notification, also send second post-modification data generated in accordance with a modification of the data having undergone the determination by the determiner to the first controller; and
the first data update processor is further configured to, when sending the rejection notification from the second controller, inform the user operating the first controller regarding content of the second post-modification data that is sent together with the rejection notification.

3. The facility device system according to claim 2, wherein the determiner is further configured to, when there is no overlap between a first update portion updated in accordance with the post-modification data sent from the first controller and a second update portion updated in accordance with a modification of the data stored in the second storage, integrate together the first update portion and the second update portion, and generate the second post-modification data.

4. The facility device system according to claim 2, wherein the determiner is further configured to, when there is overlap between a first update portion updated in accordance with the post-modification data sent from the first controller and a second update portion updated in accordance with a modification of the data stored in the second storage, generate the second post-modification data in accordance with the first update portion or the second update portion depending on a predetermined order of priority.

5. The facility device system according to claim 1, wherein
the facility device is an air conditioner,
the data is schedule data for control of the air conditioner, and
the first storage and the second storage are flash memory.

6. A controller serving as a second controller for connecting with a first controller via a network, and for controlling a facility device, the controller comprising:
a storage configured to store data relating to control of the facility device, the data including the second data;
a determiner configured to determine whether, after an acquisition of post-modification data of the second data requested to be updated from the first controller, modification is performed on data stored in the storage by a user operating the second controller; and
a data update processor configured to write the post-modification data to the storage based on results of the determination made by the determiner,
wherein the data update processor is configured to, upon determination by the determiner that there is no modification of data, send to the first controller a permission notification permitting updating of the post-modification data, and upon determination by the determiner that there is modification of data, send to the first controller a rejection notification rejecting updating of the post-modification data.

\* \* \* \* \*